United States Patent
Wang et al.

(10) Patent No.: US 10,627,133 B2
(45) Date of Patent: Apr. 21, 2020

(54) HEAT EXCHANGER

(71) Applicant: XI'AN JIAOTONG UNIVERSITY, Xi'an, Shaanxi (CN)

(72) Inventors: Qiuwang Wang, Shaanxi (CN); Zhoutuo Tan, Shaanxi (CN); Yunjia Yao, Shaanxi (CN); Chengning Yao, Shaanxi (CN); Jiapei Yang, Shaanxi (CN); Yougang Ruan, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 0 days.

(21) Appl. No.: 15/748,889

(22) PCT Filed: Aug. 2, 2016

(86) PCT No.: PCT/CN2016/092783
§ 371 (c)(1),
(2) Date: Jan. 30, 2018

(87) PCT Pub. No.: WO2017/166557
PCT Pub. Date: Oct. 5, 2017

(65) Prior Publication Data
US 2019/0011150 A1    Jan. 10, 2019

(30) Foreign Application Priority Data
Apr. 1, 2016 (CN) .......................... 2016 1 0204147

(51) Int. Cl.
*F24H 1/20* (2006.01)
*F24H 7/02* (2006.01)
(Continued)

(52) U.S. Cl.
CPC .......... *F24H 7/0266* (2013.01); *F24H 1/165* (2013.01); *F24H 8/00* (2013.01); *F24H 9/0021* (2013.01);
(Continued)

(58) Field of Classification Search
CPC ... F24H 1/206; F24H 1/46; F24H 8/00; F22B 9/08; F22B 13/00
See application file for complete search history.

(56) References Cited

U.S. PATENT DOCUMENTS 2,748,249 A    5/1956 Collerati
3,492,461 A    1/1970 Lawrence
(Continued)

FOREIGN PATENT DOCUMENTS

JP            4721108 B2      7/2011
TW            200722690 A     6/2007
WO    WO-2010147948 A2 *   12/2010 .............. F23C 3/002

*Primary Examiner* — Gregory A Wilson
(74) *Attorney, Agent, or Firm* — Global IP Services; Tianhua Gu

(57) ABSTRACT

A heat exchanger, comprising at least a double shell, wherein the lower portion of the inner space of the inner shell is filled with liquid phase change medium, and at least one coiler is provided in the upper portion. The heated fluid flows in the coiler. After the downstream side pipe of the coiler is pierced through the inner shell, at least one surrounding pipe is formed in the cavity between the double shells. The bottom heat exchange plate of heat exchanger of the inner shell is located above the heat source. The cavity between the two shells forms the flue gas passage. After bottom heat exchange plate of the inner shell is heated by the heat source, the flue gas rises from the bottom of perimeter of the inner shell along the flue gas passage and the heat is transferred to the heated fluid in the surrounding pipe. The heat device using the heat exchanger according to the present invention can significantly improve the efficiency of heat utilization.

10 Claims, 3 Drawing Sheets

(51) Int. Cl.
*F28D 15/02* (2006.01)
*F24H 8/00* (2006.01)
*F24H 1/16* (2006.01)
*F28D 1/06* (2006.01)
*F24H 9/00* (2006.01)
*F28D 7/02* (2006.01)
*F28D 21/00* (2006.01)

(52) U.S. Cl.
CPC .............. *F24H 9/0026* (2013.01); *F28D 1/06* (2013.01); *F28D 7/024* (2013.01); *F28D 15/0233* (2013.01); *F28D 15/0275* (2013.01); *F28D 21/0007* (2013.01); *F24H 1/208* (2013.01)

(56) References Cited

U.S. PATENT DOCUMENTS

| | | | | |
|---|---|---|---|---|
| 4,034,717 | A * | 7/1977 | Clum | F22B 9/08 |
| | | | | 122/359 |
| 4,373,453 | A * | 2/1983 | Foresto | F23G 5/46 |
| | | | | 110/216 |
| 4,640,458 | A * | 2/1987 | Casier | F24H 6/00 |
| | | | | 126/101 |
| 4,751,913 | A * | 6/1988 | Vetter | F23L 15/04 |
| | | | | 122/18.2 |
| 8,695,539 | B2 * | 4/2014 | Iwama | F24H 1/145 |
| | | | | 122/18.1 |
| 8,881,689 | B2 * | 11/2014 | Kameyama | F24H 1/28 |
| | | | | 122/19.2 |
| 9,513,003 | B2 * | 12/2016 | Watanabe | F23L 11/02 |
| 9,731,893 | B2 * | 8/2017 | Thiessen | B65D 88/744 |
| 10,309,686 | B2 * | 6/2019 | Nagasaka | F23D 14/68 |

* cited by examiner

HEAT EXCHANGER

CROSS REFERENCE TO RELATED PATENT APPLICATION

The present application is the US national stage of PCT/CN2016/092783 filed on Aug. 2, 2016, which claims the priority of the Chinese patent application No. CN201610204147.1 filed on Apr. 1, 2016, which applications are incorporated herein by reference.

TECHNICAL FIELD

The present invention relates to a highly efficient heat exchanger component and a gas water heater using the heat exchanger component.

BACKGROUND

The core part of the existing gas water heater is a finned tube heat exchanger through which the high temperature gas flows through the fin side of the heat exchanger to heat the water inside the heat exchange coiler. The major heat transfer method takes the limited space heat transfer in the oxygen-free copper heat exchanger, and the high temperature smoke flows through the shell gap and the radiation and convective heat transfer in the limited space occur in the tube bundle. The velocity of flue gas is low. And it is usually laminar flow. The heat flux density is low, the heat can not be utilized sufficiently enough, which will result in a waste of energy. Although the addition of condensing heat exchangers at the flue gas outlet can further utilize a small amount of water vapor generated by flue gas combustion, the large temperature difference between the high temperature gas and heated water will result in irreversible loss, thus affecting the heat transfer efficiency.

In the gas water heater disclosed in U.S. Patent Publication No. US2007/0133963 A1, a closed vacuum chamber is used as a core heat transfer unit. The heat transfer coiler for heating the water is buried in the heat conduction particles in the cavity, and the heat conduction particles fill the entire enclosed chamber. The heat of the high temperature gas passes through the wall of the closed cavity in the form of heat conduction and then heat is conducted into heat conduction particles in vacuum and dry condition within the enclosed cavity, relying on the vibration of the particles, the ability of heat conduction is enhanced.

SUMMARY

The present invention provides a highly efficient heat exchanger component for rapid heat production in view of the problem that the heat utilization of the gas water heater in the prior art is low and the heat production speed is slow. The components is used in gas water heaters and other heating equipment using high temperature flame or high temperature flue gas as the main heat source. It will significantly improve the efficiency of heat utilization.

The technical solution of the present invention for solving the above-mentioned technical problems is that:

A heat exchanger is provided, using high temperature flame or high temperature flue gas as a heat source, comprising at least two layers of shells. Wherein the lower portion of the inner space of the inner shell is filled with a liquid phase change medium, and at least one first heat exchange tube is provided at the upper portion. The heated fluid flows in the first heat exchange tube; After downstream side pipe of the at least one first heat exchange tube passes through the inner shell, at least one second heat exchange tube is formed in the cavity between the double shells; The bottom heat exchange plate of the inner shell is located above the heat source; The cavity between the two shells forms a flue gas passage. After the bottom heat exchange plate of the body is heated by the heat source, the flue gas rises from perimeter of the outside bottom of the inner shell along the flue gas passage and the heat is transferred to the heated fluid in the second heat exchange tube.

The preferred technical solution further comprises any of the following technical features:

The outer shell of the double-shell is made of a heat-insulating material, or the outer shell is wrapped around by a heat-insulating material.

Wherein the first heat exchange tube and the second heat exchange tube are integrally formed by one tube.

And the first heat exchange tube is subjected to a hydrophobic treatment.

The inner wall of the inside of the inner shell is evacuated, the connection part between the tube and the shell is sealed, in order to eliminate the influence of the non-condensable gas inside the inner shell and prevent the leakage.

And the central portion of the inner space of the inner shell is provided with a filter screen for liquid-resistant vapor-through adjacent to the boiling side of the liquid phase change medium.

And the top of the outer shell of the double shell is provided with an induced draft fan for pumping the flue gas in the flue gas passage.

The second heat exchange tube is surrounded within the cavity between the double shells, and a fin is provided on the walls of the tube.

The present invention also provides a water heater using the heat exchanger described above.

The invention also provides a three-heating core phase change gas water heater, which comprises a three-layer heating cores: a first heating core is the remaining flue gas heat exchange part, a second heating core is a phase change heat exchanger, a third heating core is the flue gas heat exchange part around the heat exchange cavity. The heater comprises three layer of shells, which are a first, second and third shells from outside to inside, respectively. And the third heating core area is located between the second and the third layer of shell.

The first shell is the outermost shell, a heat exchange tube is provided at the left top, the first heating core area is located in the gap between the first shell and second shell, a burner is arranged at the bottom of the second shell. The third shell is located above the burner, and the spiral heat exchange tube is arranged outside the third shell. The heat exchange tube is finned to strengthen the heat exchange, this area is the third heating core area. Inside the third shell is the second heating core area, that is, the phase change heat exchanger. The upper part of the heat exchanger is arranged with a heat exchange water pipe and the lower part is a phase change medium. Heat exchange tube enters the first, second and third heating core for heat transfer, successively.

The above structure forms a complete phase-change three-heating core heat exchange system. The water pipe is one pipe from beginning to end, and the burner is arranged below the lower plate of the phase change heat exchanger. The flue gas flows upward along the gap between the second and third shells and finally discharged from the upper part of the water heater.

The present invention has the following effects in comparison with the prior art:

Boiling, condensing heat transfer is the liquid medium become boiling when heated while the vaporized medium get condensate when cooled with a phase change heat transfer process. There is a variety of disturbances of boiling heat exchange caused by the formation, growth and escape of bubbles from the heating wall. And condensation heat exchange is a high efficiency heat exchange method utilizing steam on the wall condensed into liquid film or liquid droplets. In the heat exchange process, due to the release or recovery of latent heat of vaporization, the two methods both have the advantages of high heat transfer intensity and high heat flux density. For example, the heat flux of boiling water in boiling range can reach $10^5\sim10^6$ W/m$^2$, which is at least an order of magnitudes higher than the heat flux of the forced convection heat transfer, so that heat is absorbed better.

The heat exchanger structure provided by the invention uses high temperature flame or high temperature flue gas for heating the phase change medium inside the closed inner shell first. And then heat source flows through the surrounding pipe between the double shells, and the temperature decreases in turn, to achieve the gradient utilization of high temperature flame or high temperature flue gas heat.

Flue gas assisted heating, that is, the first and third heat core, and the high efficiency phase change heat exchange within the phase change heat exchanger, that is, the second heat core, together form a complete three heating core heat transfer mode, which can significantly enhance thermal efficiency of the gas water heater. The heat generated by the combustion of the gas can be fully utilized to ensure a quick start, gas saving purposes of the water heater under the premise of the original function. Vaporized phase change medium becomes condensing medium after condensation in the pipeline, and steamed again after falling down, to achieve the effect of rapid start and cycle operation. In order to reduce the effect of the non-condensable gas on the condensate heat transfer, the phase change heat exchanger is subjected to a vacuum treatment and the insulating material is wrapped around the outside of the flue gas heat exchanger surrounding the phase change heat exchanger or the low thermal conductivity material is selected as the material of outer shell. The shells allow the flue gas to flow as far as possible in the vertical direction, and the heat is absorbed by the water in the coiler of the third heating core to achieve a better heat transfer effect. Compared with the existing gas water heater, the present invention adds a new heating core, so that the thermal efficiency of the gas water heater is greatly improved.

DESCRIPTION OF COMPONENT REFERENCE NUMERALS

1: inner shell. 2: outer shell. 3: phase change medium. 4: coiler.
5: heat exchanger inlet pipe section. 6: heat source. 7: bottom heat exchange plate.
8: filter screen. 9: surrounding pipe. 10: induced draft fan. 11: water heater shell.
12: burner. 13: water inlet pipe. 14: first heating core area. 15: second heating core area. 16: third heating core area. 17: water outlet pipe.
18: fin.

DETAILED DESCRIPTION OF THE PREFERRED EMBODIMENTS

Figure 1:
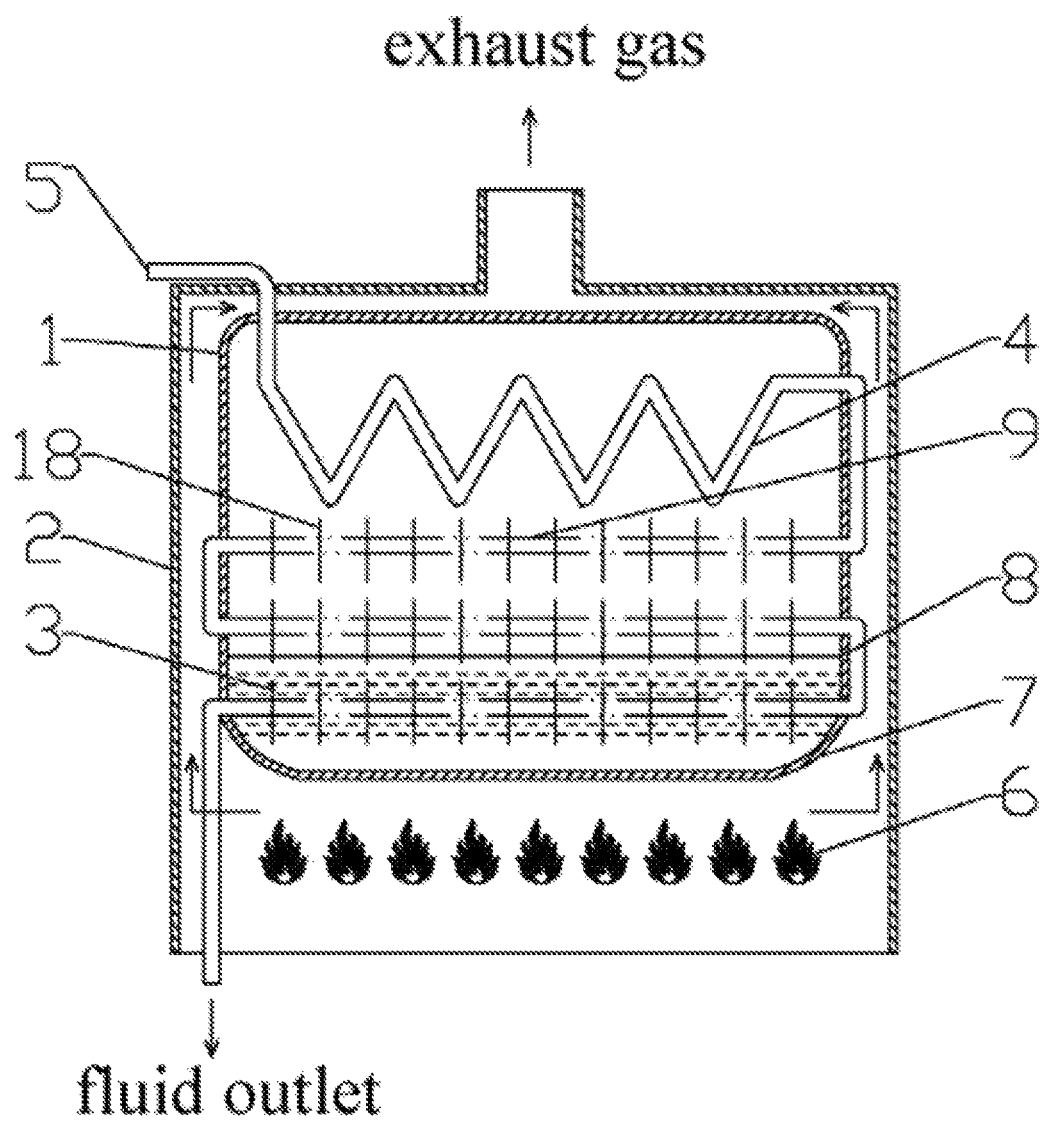
FIG. 1 is a schematic view of the structure of the heat exchanger according to the present invention.
Figure 2:
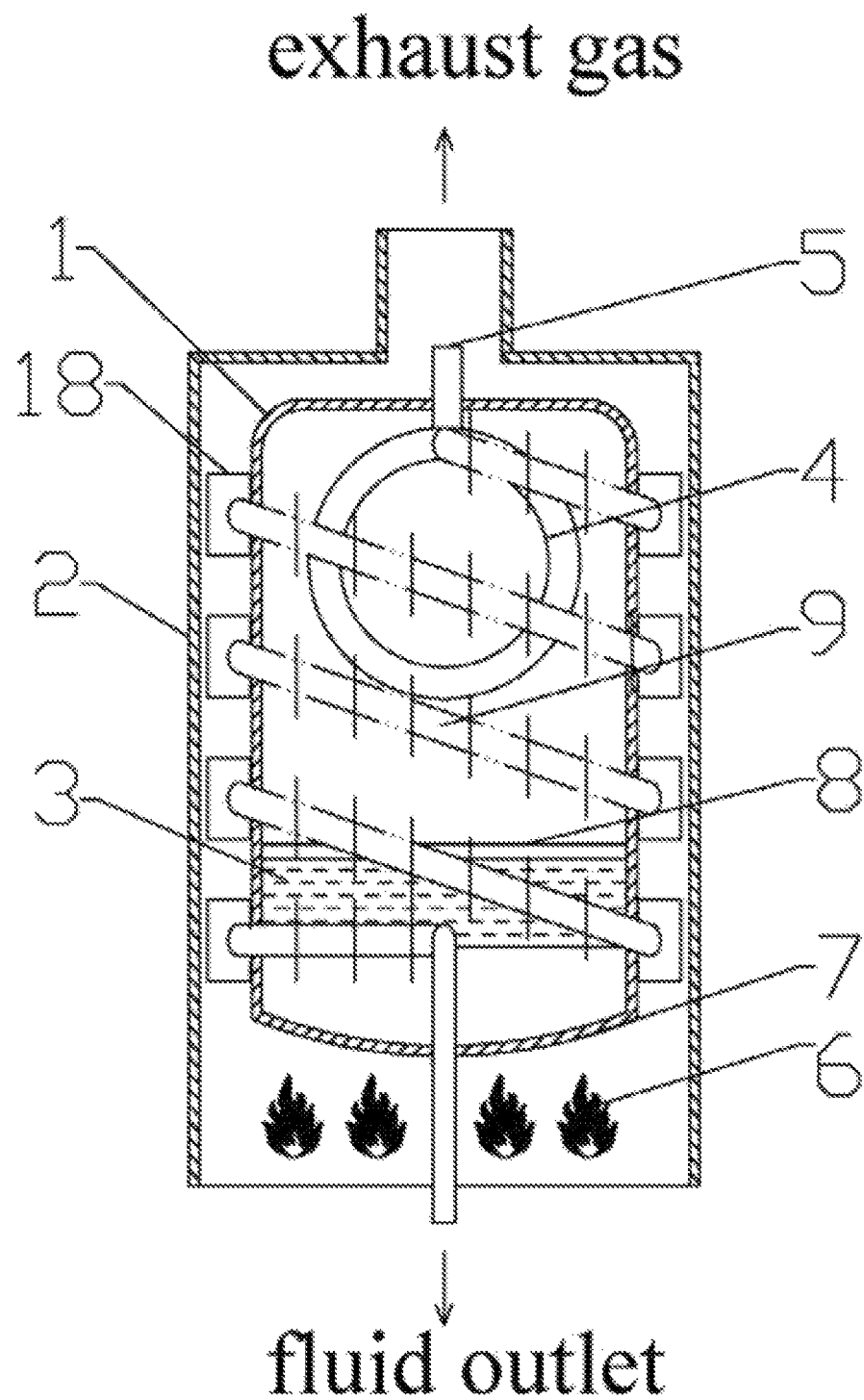
FIG. 2 is a cross-section left view of the heat exchanger according to the present invention.

FIGS. 1 and 2 are schematic views of the structure of a heat exchanger provided by the present invention.

The heat exchanger comprises a double shell. The lower portion of the inner space of the inner shell 1 is filled with the liquid phase change medium 3, the first heat transfer tube is provided in the upper portion, and the first heat transfer tube may be designed as a coiler 4. The heated fluid flows within the coiler 4, and the coiler 4 may be made of material having a high thermal conductivity, and the outer wall of the coiler 4 may be subjected to a hydrophobic treatment to promote bead-like coagulation. The phase change temperature of the liquid phase change medium 3 should be higher than the operating temperature of the heated fluid. The upstream side of the coiler 4 is an inlet pipe section 5 of the heat exchanger which penetrates from the outside of the double-shell. A downstream side of the coil 4 pierces through the inner shell and threads out after surrounding around the cavity between the double shells. High temperature flame or high temperature flue gas provides heat source 6 for the heat exchanger, a bottom heat exchanger plate 7 of heat exchanger inner shell 1 is provided above the heat source 6. The inside of the inner shell 1 is subjected to a vacuum treatment, and the connection between the pipe and the shell are sealed to remove the influence of the non-condensable gas and prevent leakage.

The liquid phase change medium 3 in the lower portion of the inner space of the inner shell 1 is heated and vaporized, and then flows to the upper portion of the inner space of the inner shell 1. The vaporized phase change medium 3 contacts with the upper coiler 4 and is condensed into liquid, and then falls into the lower portion of the inner space of the inner shell 1 and will be vaporized again, thereby forming the self-circulation of the phase change medium 3. As a result, the fluid in the coiler 4 is heated.

Preferably, a filter screen 8 for liquid-resistance and gas-through is provided at the middle of the inner space of the inner shell 1 near to the boiling side of the liquid phase change medium 3 so as to prevent the condensate from directly falling to the vapor-liquid interface and suppressing the rapid generation of the vapor, which results in reducing heat transfer efficiency. The filter screen 8 is inclined, or the center of the filter screen is slightly higher than that of the perimeter so that the liquid phase change medium 3 can flow to the lower portion of the filter screen 8 in the vertical direction after the condensation and return to the liquid surface of the liquid phase change medium 3.

The cavity between the double shells forms a flue gas passage. After the heat source 6 heats the bottom heat exchange plate 7 of the inner shell of the heat exchanger, the flue gas rises vertically along the flue gas passage, the heat is transferred to the heated fluid in the second heat transfer tube. The second heat transfer tube may be designed as surrounding pipe 9. Due to the chimney effect of the flue gas passage, the high temperature flue gas passes over the surrounding pipe 9 at a faster rate, and the heat is absorbed by the heated fluid in the surrounding pipe 9 to achieve a better heat transfer effect.

Preferably, the induced draft fan 10 is provided at the top of the outer shell 2 to pump the flue gas to further increase the flue gas flow rate and increase the heat transfer amount. Further, in order to reduce the heat of the high-temperature flue gas dissipating through the outer shell 2 as far as possible, a heat insulating material may be wrapped around the outer shell 2, or the outer shell 2 may be made of a heat insulating material such as ceramic. Fins may be provided on the walls of the surrounding pipe 9 to increase the heat supply area of the high temperature flue gas.

In the fore-mentioned heat exchanger structure, the high temperature flame or high temperature flue gas is used for heating the phase change medium 3 inside the closed inner shell 1 first and then flows through the surrounding pipe 9 between the double shells, and the temperature is successively lowered to achieve cascade utilization of the heat of high temperature flame or high temperature gas.

The heat exchanger of the present invention described above can be used in various heating equipments which use high temperature flame or high temperature flue gas as the main heat source for improving the thermal efficiency of the heating equipments. The following embodiments illustrate the use of the heat exchanger according to the present invention in a heating device, taking gas water heater as an example.

Figure 3:
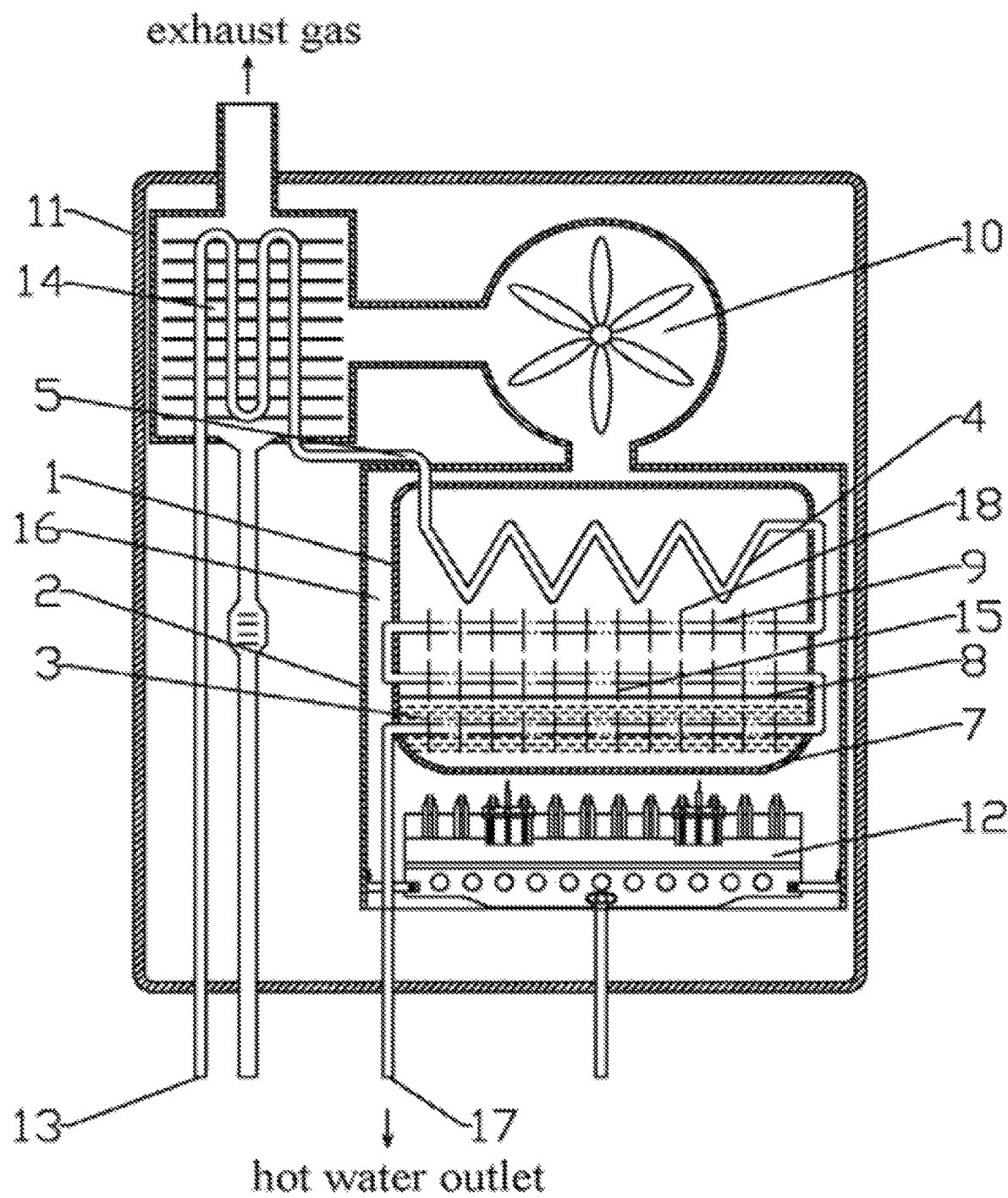
FIG. 3 is a schematic structural view of a gas water heater using the heat exchanger according to the present invention.

The gas water heater structure provided by the present invention is shown in FIG. 3, and the core part is the above mentioned heat exchanger. The water inlet pipe 13 enters the first layer of the shell (i.e., the water heater shell 11) from the lower portion of the water heater and reaches the first heating core 14, the first heating core 14 performs heat exchange of the remaining flue gas pumped from the heat exchanger by the induced draft fan 10. The water pipes in the first heating core 14 are arranged in a coiler-like manner and the pipes at the coiler outlet pass through the second and third shells (i.e., double shells 1, 2 of the heat exchanger) into the second heating core area 15 (i.e., the interior of the inner shell of the heat exchanger), and then threads out the third shell into the third heating core area 16 (i.e., the cavity between the two shells of the heat exchanger), surrounding the outside of the heat exchanger between the second layer and third layer of shell, and finally become the lower water outlet pipe 17 of the water heater. The burner 12 is disposed below the bottom heat exchange plate 7 of the heat exchanger inner shell 1. Thus a three-thermonuclear phase change gas water heater is constituted.

After the gas water heater is started, the water in the inlet pipe 13 enters the first heating core 14 from the lower portion of the water heater and burns in the burner 12 and passes through the second and third heating core area 15, 16 (i.e., the heat exchange of the present invention). The remaining flue gas is used for a first heat exchange that takes condensation of water vapor as major heat transfer. The water is preheated through the first heating core area 14 and flows along the inlet section 5 of the heat exchanger, passes through the second and third shells, and enters the second heating core area 15.

The second heating area 15 is mainly composed of condensing heat exchange containing phase change. The phase change temperature of the phase change medium 3 is higher than the leaving water temperature of the hot water, and optional medium can be deionized water. In the second heating core area 15, the liquid phase change medium 3 is boiled and vaporized. The heat of the boiling vaporization of the liquid phase change medium 3 is derived from the high temperature flame produced by the burner. And the vapor meets the upper water coiler 4 and condensation heat exchange occurs, the self-cycle of phase change medium is formed and the water in the water pipe is sufficiently heated.

After the heat exchange in the second heating core area 15 is completed, the water in the water pipe flows to the surrounding pipe 9 at the downstream side and radiative heat exchange and heat convection with the flue gas in the third heating core area 16 occur. Thereafter, hot water flows out of the outlet pipe 17.

The gas water heater achieves the efficient gradient utilization of flue gas heat through the three-heating core heat transfer mode. And temperature of exhaust gas discharged is significantly reduced. In order to reduce the flow resistance as much as possible, the water pipe in the gas water heater can be a pipe from beginning to end, or can be multiple pipes arranged in the parallel with single inlet and single outlet and no branch. Of course, some pipelines are also allowed to be connected there between in other ways to form one pipe. In addition, in order to increase the heat exchange area, enhance the heat exchange effect, fin structure can be arranged outside the water pipe of the water heater in different degrees, and bottom heat exchange plate 7 of the heat exchanger can be designed as curved surface.

The present invention does not describe the burner, the water-gas linkage valve, and the automatic control circuit conventionally disposed in the gas water heater in detail.

The embodiments of the present invention are merely illustrative of the present invention and are not intended to limit the scope of the invention, and those skilled in the technology may also make changes to them, the changes are within the scope of this invention as long as they do not exceed the spirit of the invention.

INDUSTRIAL APPLICABILITY

The heat exchanger according to the present invention is applicable to various heating device using high temperature flame or high temperature flue gas as the main heat source.

What is claimed is:
1. A heat exchanger comprising:
 a boiling-condensing heat transfer, which comprises a closed container having at least two layers of shells, a lower portion of the container is filled with a liquid phase change medium, at least one first heat exchange tube is provided at the upper portion of the container fluid being heated flows in the first heat exchange tube;
 at least one second heat exchange tube, which is a downstream side pipe of the at least one first heat exchange tube formed in a cavity between the double shells;
 a heater, which comprises a heat source and a bottom heat exchange plate of the container located above the heat source;
 a flue gas passage, which comprises a cavity between the two shells;
 after the bottom heat exchange plate of the container is heated by the heat source, in the boiling-condensing heat transfer the vaporized liquid phase change medium is condensed by the first exchange tube to heat the fluid therein by a boiling-condensing heat exchange; in the flue gas passage the fluid in the second heat exchange tube is heated by heat exchange with flue gas.

2. The heat exchanger according to claim 1, wherein the outer shell of the double-shell is made of a heat-insulating material, or the outer shell is wrapped around by a heat-insulating material.

3. The heat exchanger according to claim 1, wherein the first heat exchange tube and the second heat exchange tube are integrally formed by one tube.

4. The heat exchanger according to claim 1, wherein the first heat exchange tube is subjected to a hydrophobic treatment.

5. The heat exchanger according to claim 1, wherein connection parts between the first heat exchange tube and the second heat exchange tube with the closed container are sealed.

6. The heat exchanger according to claim 1, wherein a central portion of the inner space of the closed container is provided with a filter screen for liquid-resistant vapor-through adjacent to the boiling side of the liquid phase change medium.

7. The heat exchanger according to claim 1, wherein a top of the outer shell of the double shell is provided with an induced draft fan for pumping the flue gas in the flue gas passage.

8. The heat exchanger according to claim 1 wherein the second heat exchange tube is surrounded within a cavity between the double shells, and a fin is provided on the wall of the second heat exchange tube.

9. A water heater comprising the heat exchanger according to claim 1.

10. A three-heating core phase change gas water heater comprising:
   a three-layer heating cores, a first heating core is a remaining flue gas heat exchange section, a second heating core is a vacuum phase change heat exchange section of an inner closed shell, a third heating core is a flue gas swept around the pipeline heat exchange part around the heat exchange chamber; the three-layer heating cores comprises three layer of shells, which are a first, a second and a third shells from outside to inside, respectively; a third heating core area is located between the second and the third layer of the shell;
   the first shell is the outermost shell, a heat exchange tube is provided at the left top, the first heating core area is located in a gap between the first shell and second shell, a burner is arranged at a bottom of the second shell, the third shell is located above the burner, and a spiral heat exchange tube is arranged outside the third shell, the heat exchange tube is finned to strengthen the heat exchange, this area is the third heating core area, inside the third shell is the second heating core area, that is, the phase change heat exchanger, an upper part of the phase change heat exchanger is arranged with a heat exchange water pipe and a lower part is a phase change medium, the heat exchange tube enters the first, second and third heating core area for heat exchange, successively;
   the water pipe is one pipe from beginning to end, and the burner is arranged below the lower plate of the phase change heat exchanger, the flue gas flows upward along the gap between the second and third shells and finally discharged from the upper part of the water heater.

* * * * *